(12) United States Patent
Maetz et al.

(10) Patent No.: US 7,448,059 B1
(45) Date of Patent: Nov. 4, 2008

(54) PROCESS FOR TRANSMITTING AND PROCESSING AN EVOLUTIVE ABSTRACT IN A TELEVISION SYSTEM, RECEIVER AND TRANSMITTER IN SUCH A SYSTEM

(75) Inventors: Yves Maetz, Melesse (FR); Nour-Eddine Tazine, Noyal sur Vilaine (FR)

(73) Assignee: Thomson Licensing, Boulogne Billancourt (FR)

( * ) Notice: Subject to any disclaimer, the term of this patent is extended or adjusted under 35 U.S.C. 154(b) by 842 days.

(21) Appl. No.: 09/706,684

(22) Filed: Nov. 6, 2000

(30) Foreign Application Priority Data

Nov. 10, 1999 (FR) .................................. 99 14134

(51) Int. Cl.
*H04N 5/445* (2006.01)
*G06F 13/00* (2006.01)
*G06F 3/00* (2006.01)

(52) U.S. Cl. ........................................ 725/50; 725/40
(58) Field of Classification Search .................. 725/40, 725/50
See application file for complete search history.

(56) References Cited

U.S. PATENT DOCUMENTS

| | | | | |
|---|---|---|---|---|
| 5,589,892 A | * | 12/1996 | Knee et al. ..................... | 725/43 |
| 5,812,123 A | | 9/1998 | Rowe et al. ................... | 345/327 |
| 6,035,304 A | * | 3/2000 | Machida et al. ........... | 707/104.1 |
| 6,510,555 B1 | * | 1/2003 | Tsurumoto ................... | 725/92 |
| 6,536,041 B1 | * | 3/2003 | Knudson et al. .............. | 725/39 |

FOREIGN PATENT DOCUMENTS

| | | |
|---|---|---|
| JP | 10-032773 | 2/1998 |
| JP | 2000-124895 | 4/2000 |
| WO | 96/41478 | 12/1996 |
| WO | WO 98/27497 | 6/1998 |
| WO | 98/57497 | 12/1998 |

OTHER PUBLICATIONS

Hayami, Yuta, "Method for safely transmitting digital data from an information source to a receiver", Patent App. No.: JP2002-548955, Date created: Dec. 25, 2007, pp. 1-4.
European Telecommunications Standards Institute, "Digital Video Broadcasting (DVB); Specification for Service Information (Sl) in DVB systems", EN 300 468 V1.3.1, pp. 1-74.

* cited by examiner

*Primary Examiner*—Hunter B. Lonsberry
(74) *Attorney, Agent, or Firm*—Joseph J. Laks; Paul P. Kiel (57) ABSTRACT

The invention relates to a process for transmitting service information in a television system. The invention relates more particularly to the providing of an upgradeable summary tied to the broadcasting of an event. Versions of the summary are transmitted at certain moments in the service information. These versions are concatenated in the receiver so that the result of the concatenation constitutes a summary of that part of the event which has already been broadcast.

The invention also relates to a receiver for receiving service information in such a television system, to the process for processing this service information at the level of this receiver and to the transmitter implementing the transmission process according to the invention.

10 Claims, 6 Drawing Sheets

| Event | 223 | | | | | |
|---|---|---|---|---|---|---|
| Action | ① | ② | ③ | ④ | ⑤ | ⑥ |
| Updated version number | 0 | | 1 | | 2 | |
| Content of the text field of the dynamic summary | Empty | | DES 1 | | DES 2 | |

PROCESS FOR TRANSMITTING AND PROCESSING AN EVOLUTIVE ABSTRACT IN A TELEVISION SYSTEM, RECEIVER AND TRANSMITTER IN SUCH A SYSTEM

FIELD OF THE INVENTION

The invention is concerned with the field of the management of service information in a television system. The invention relates more particularly to a process for transmitting and a process for processing such service information; it also relates to a transmitter and a receiver for transmitting and receiving this service information in a television system, especially a digital television decoder.

The invention can however be extended to other services such as those present on the WEB.

BACKGROUND

A Man/Machine Interface or MMI provides the television viewer with a means making it possible to consult information typically relating to the programs broadcast.

The information is transmitted by multiplexing appropriate data packets in the digital data stream. A designation often used for this type of data is "Service Information" (or more simply "SI"). In what follows, the term "service" will be used to refer to a series of programs (televised news bulletins, films, shows, etc.) under the supervision of one and the same program provider ("broadcaster" or "service provider").

The service information is broadcast periodically by the service provider. This information describes, among other things, events in respect of a program of a service. These events are parameterized by their names, the service provider associated with them, etc.

It is common practice to associate, with each of the events, information or descriptors summarizing the content of these events, enabling the user to ascertain the general content of an event by selecting a specific topic from the electronic program guide (EPG) intended for displaying the summaries of events.

However, this information or these summary descriptors only advise as to the general content of the relevant event.

The aim of the invention is to remedy this problem.

SUMMARY OF THE INVENTION

For this purpose, the subject of the invention is a process for transmitting service information in a television system comprising a transmitter and a receiver, wherein it includes the steps, at the level of the transmitter of:
  transmitting an event;
  transmitting versions of an upgradeable summary of the said event, the content of a current version of the summary being dependent on the content of the event occurring since the transmission of the previous version of the summary up to the instant of transmission of the current version of the summary;
  and at the level of the receiver of:
  concatenating versions successively received in a memory of the receiver, the upgradeable summary of the said event being the result of the concatenating of the versions.

In this way, if the user wishes to view a summary of the event, the invention enables him to display a summary solely regarding the already broadcast part of the event. Through this advantage of taking into account the time elapsed since the start of the event, the summary thus created is akin to an upgradeable and dynamic summary of an event.

According to one embodiment, the said upgradeable summary is updated as a function of the varying of the content of the event according to one of the following modes:
  periodically, following the occurrence of a particular situation in the content of the event,
  following a command at the level of the transmitter of the event.

According to one embodiment, the step of transmitting the said summary is performed a plurality of times for one and the same update version of the said summary.

According to one embodiment, the content of a version of the summary is referenced with a version number which is incremented with each new version.

According to one embodiment, the said summary is transmitted in a digital stream which includes a summary descriptor identified by a specific identifier.

The subject of the invention is also a process for processing service information using a television receiver, wherein the process includes the steps:
  of receiving an event;
  of receiving versions of an upgradeable summary of the said event, the content of a current version of the summary being dependent on the content of the event occurring since the transmission of the previous version of the summary up to the instant of transmission of the current version of the summary;
  of concatenating versions successively received, the upgradeable summary of the said event being the result of the concatenating of the versions;
  of storing the upgradeable summary in a memory of the receiver.

According to one embodiment, the receiving, concatenating and storing steps are activated by a request from an application executed in the receiver, the said application being preferentially a user interface.

According to one embodiment, the process includes a step of depicting on depicting means the stored upgradeable summary, following a request from an application.

According to one embodiment, the processing process according to the invention also includes a step of displaying a time indication tied to the latest version received and displayed.

According to one embodiment, the said upgradeable summary is transmitted in a digital stream which includes a summary descriptor identified by a specific identifier.

The subject of the invention is also a receiver for receiving service information in a television system, wherein it includes:
  receiving means for receiving events and versions of an upgradeable summary of the said event;
  means for concatenating versions successively received, the upgradeable summary of the said event being the result of the concatenating of the versions;
  means for storing the upgradeable summary in a memory of the receiver;
  means for displaying the upgradeable summary.

According to one embodiment, the receiver includes a means of activation enabling the user to activate the means for displaying the upgradeable summary.

According to one embodiment, the receiver includes a means for detecting the receipt of a new version, the said detecting means activating the means for displaying the upgradeable summary upon each new reception.

The subject of the invention is also a transmitter for transmitting service information in a television system, wherein it comprises:

means for transmitting an event;

means for transmitting versions of an upgradeable summary of the said event, the content of a current version of the summary being dependent on the content of the event occurring since the transmission of the previous version of the summary up to the instant of transmission of the current version of the summary.

BRIEF DESCRIPTION OF THE DRAWINGS

Other characteristics and advantages of the present invention will emerge from the description of the exemplary embodiments which will follow, taken by way of non-limiting examples, with reference to the appended figures in which:

FIG. 8 represents the information chart at a moment when the text field of the dynamic summary descriptor has been filled in, FIG. 9 represents an information chart at a later moment when the text field of the dynamic summary descriptor has again been filled in.

DETAILED DESCRIPTION

For fuller information on the format and content of service data, MPEG and DVB tables and sections, reference may be made in particular to the following three documents:

EN 300 468—Specification for Service Information (SI) in Digital Video Broadcast (DVB) systems—V1.3.1 (1998-02), ISO/IEC 13818-1 (1994) Generic Coding of Moving Pictures and Associated Audio—Recommendation H.220, also known as "MPEG II Systems", and ETR 211—Digital Broadcasting systems for television: Implementation guidelines for the use of MPEG-2 systems; Guidelines on implementation and usage of service information.

Figure 1:
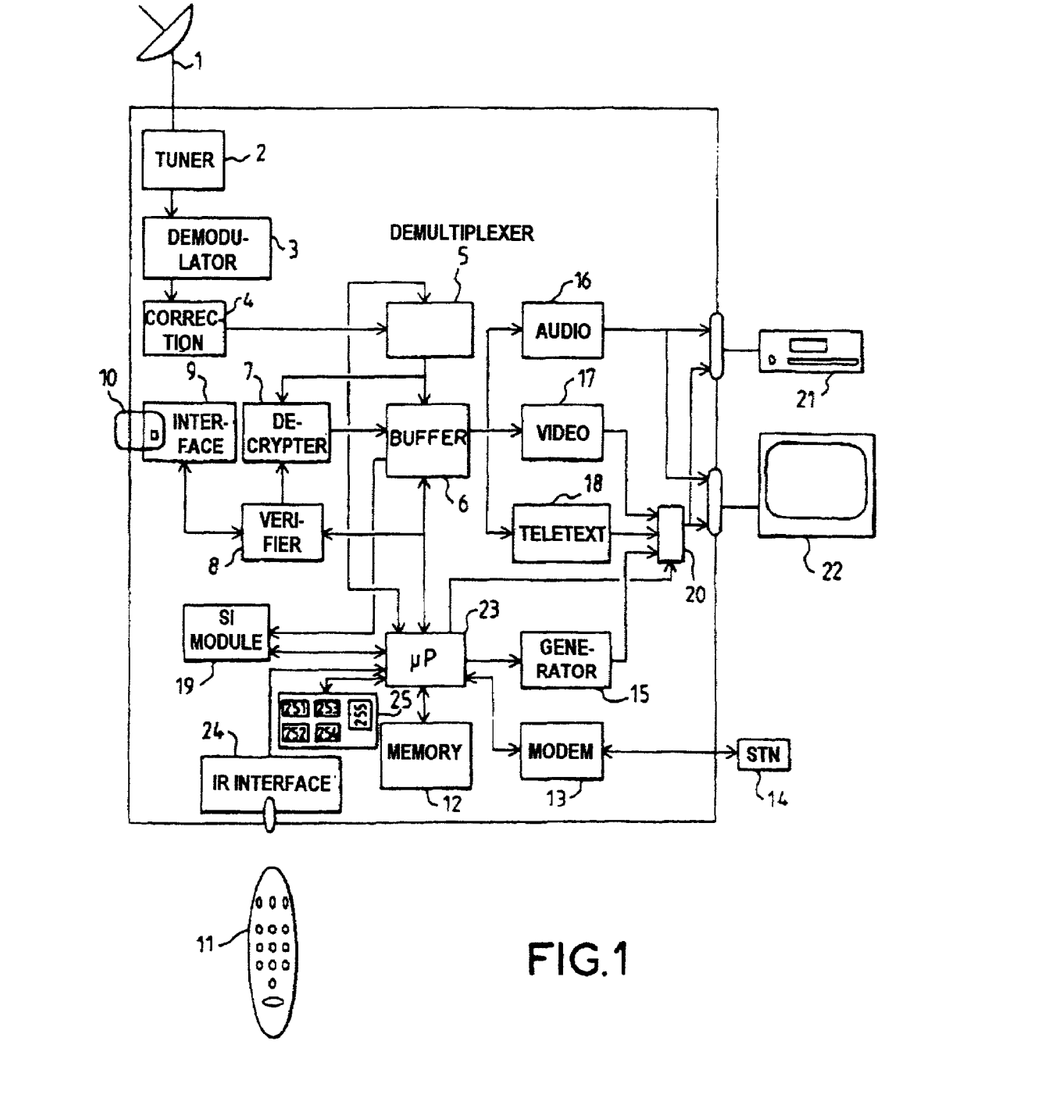
FIG. 1 is a block diagram of a television receiver in accordance with the present exemplary embodiment.

FIG. 1 is a block diagram of a DVB ("Digital Video Broadcasting") type digital television integrated decoder/receiver.

It is quite obvious that the invention is not limited to this physical environment, but may easily be adapted to any other type of transmission of service data, for example transmission by way of data modulated in the frame flyback interval. Its utilization in network-type (e.g. Internet) environments may also be considered.

The decoder of FIG. 1 is linked to an antenna 1, itself linked to a tuner 2 of the decoder. The signal provided by the tuner is demodulated by a demodulator 3. The demodulated data are corrected by a corrector circuit 4 and transmitted to a demultiplexer 5.

The latter is, for example, a demultiplexer similar to that described in French patent application No. 95 15767 filed on 29 Dec. 1995 in the name of the Applicant. The demultiplexer 5 includes a certain number of filtering registers, referred to as filters by extension, programmed by a microprocessor 23 as a function of the various applications supported by the decoder. The demultiplexer compares the content of the filtering registers with certain parameters of the data packets and loads the data packets corresponding to a positive comparison.

For the clarity of the layout, only the most important connections of the microprocessor 23 are illustrated.

The audio or video packets or sections filtered by the demultiplexer are stored in predefined areas of a buffer memory 6 pending applications. If necessary, the information is firstly decrypted by a decrypter circuit 7 as a function of the user's entitlements, before being stored in this buffer memory 6.

According to the present example, there are five applications: an audio decoder 16, a video decoder 17, a Teletext decoder 18, an access control assembly (comprising the decrypter 7, a verifying microcontroller 8 and an interface for a microprocessor card 9 linked in normal operating mode to a microprocessor card 10), as well as a module for managing the service data 19.

The decoder also includes an infrared interface of a remote control 24, the said interface also being linked to the microprocessor 23. The latter is connected to a memory 12 containing the operating system as well as the resident or downloaded programs for implementing the applications.

A modem 13 linked to the switched telephone network 14 is also controlled by the microprocessor.

A character generator 15 allows the generation of command menus or graphics relating to the parameters of the decoder or to a particular application. The video signal generated by this character generator is multiplexed with one of the video signals originating from the video decoder 17 or from the teletext decoder 18 heading for a first SCART socket linked to a television 22 or a second SCART socket linked to a video recorder 21. The multiplexing circuit 20 is managed by the microprocessor 23.

According to the present exemplary embodiment, the module for managing the service data is physically speaking a program managed by the microprocessor, although conceptually, it involves an application which processes data packets, in the guise of an audio or video decoder, dedicated circuits being used for these data packets.

The module is an interface between the service data (MPEG and DVB tables and sections) and customer applications (program guide, tele-purchasing, interactive games, etc.). It manages the requests of the customer applications and maintains an internal database on the strength of the service data received.

According to the present exemplary embodiment, the customer application is a program guide also managed by the microprocessor.

For further particulars regarding this module 19, and more generally, the relations between the demultiplexer/microprocessor, the module for managing the service data and the customer application, the reader will be able to refer to French patent application No. 97 15163 filed on 2 Dec. 1997 in the name of the Applicant. In this patent application, it is noted that the management module makes available to the customer applications a certain number of functions intended for formulating the requests relating to the information needed by the application regarding the event summary. The mechanism for managing these requests does not form the subject of the present patent application and will not be made explicit here.

According to one embodiment, the receiver described above is implemented for the receiving of a digital data stream according to the aforesaid DVB standard.

One of the roles of the module for managing service data is to program the filters of the demultiplexer. To fulfil this function and allow fast access to the sought-after data, it maintains an image of the physical structure of the network or networks to which it has access.

The documents EN 300 468 (document I) and ISO/IEC 13818-1 define ten tables giving information on the configuring of the network or networks, bouquets, services and events transmitted. The tables are identified by particular values of packet identification data or "PID" and of table identifiers ("table_id"), whose values are defined by the said documents. Each table contains a version identifier making it possible to determine whether, from one transmission of the table to another, the content of this table has changed.

The table which interests us here is the so-called event information table "EIT". The EIT table includes information on the events within a given service. Four types of EIT table are envisaged, ordered according to their table identifier:

two tables comprising the information regarding the current and next event of the current transmission channel or another transmission channel ("Transport stream"), two tables comprising the event programming information for the current transmission channel or another channel, for a longer duration.

In what follows, we shall be interested only in the current events of the current transmission channel and in the associated EIT table.

The EIT table contains data relating to events or programs such as event names, event duration, event start times, etc. The use of various descriptors allows the transmission of various types of event information, for example for various types of service. Part 6 entitled "Descriptors" of document I describes the various descriptors which can be used within the SI tables by allocating them a specific address.

Thus, as is apparent from table 12 of part 6, the current event can be described by a certain number of descriptors. This table 12 features a static summary descriptor (or "short_event_descriptor") which will be referred to as the SE descriptor (standing for "Short Event"), which is described in greater detail in paragraph 6.2.27 of document I and which provides a static summary of the current event, namely a general summary of the event.

It is noted that the table identifier values 0X80 to 0XFE are intended for private tables.

According to the invention, a so-called dynamic summary descriptor (or "Dynamic event_descriptor"), which will be referred to as the DES descriptor (standing for "Dynamic Event Summary") is transmitted by the service provider in the private extensions of the DVB stream, in the current/next EIT table of the current transmission channel.

Using the DVB terminology, this descriptor can be defined as follows:

| Syntax | n bits | Mnemonic |
|---|---|---|
| DES_descriptor( ) { | | |
| Descriptor tag | 8 | Uimsbf |
| Descriptor_length | 8 | Uimsbf |
| ISO_639_language_code | 4 | Bslbf |
| Update_version_number | 8 | Uimsbf |
| Update_time | 40 | Bslbf |
| Text_length | 8 | Uimsbf |
| For (i=0 to Text_length) { | | |
| Text_characters | 8 | Uimsbf |
| } | | |
| } | | |

The descriptor identifier is an 8-bit field which identifies each descriptor. The possible values are described in the document ISO/IEC 13818-1. Since the descriptor identifier values lying between 0x80 and 0xFE are reserved for private descriptors, they could be used for the DES identifier or identifiers. In what follows, it will be assumed that no other private descriptor is used and we will choose, for example, 0X80 as the identifier value for the DES descriptor.

The descriptor length is the total number of bytes in the data part of the descriptor.

The ISO_639 language code identifies the language of the textual data of the descriptor. 'fre', for example, corresponds to the French language.

The update version number is the current number of the version of the descriptor. This number is incremented with each modification of the content of the DES descriptor so that the application can decide on the updating of it data cache.

The update time is the time at which the information was updated.

The text length is the number of characters contained in the content of the descriptor, that is to say the number of characters of the text corresponding to the dynamic summary.

According to these definitions, a DES descriptor could have the following form, when transmitting a car race:

DES_descriptor( ) {
0x80
118
'fre'
1
'18:34'
108
'After three hours of racing, car No. 3 is still in the lead despite the unrelenting attacks of its rivals'.
}

As stated earlier, the receiving of this descriptor at the level of the receiver and its extraction by means of specific filters could be implemented by the means described in French patent application No. 97 15163.

Figure 2:
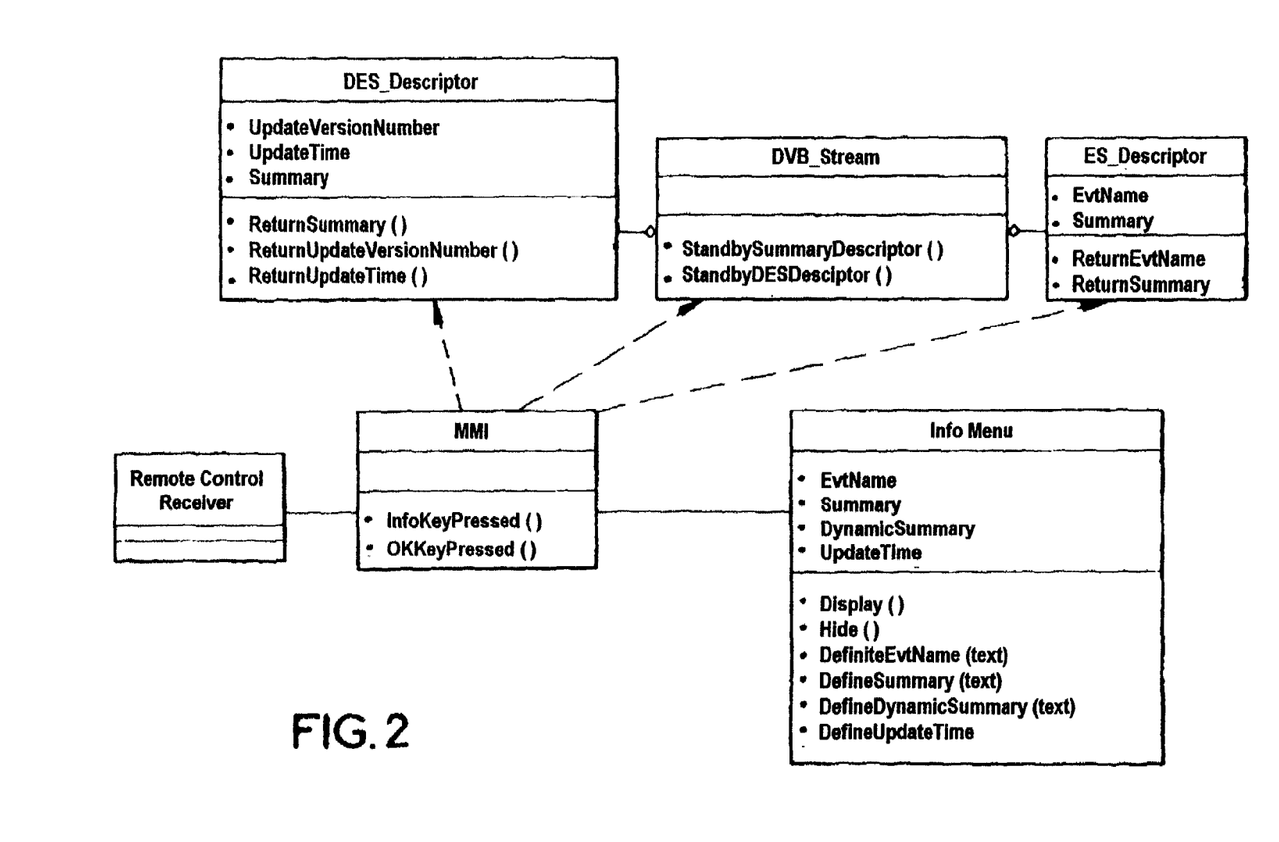
FIG. 2 represents a diagram of classes according to the UML ("Unified Modelling Language") notation matching up various entities within the framework of the invention.

FIG. 2 represents a class diagram according to the UML notation matching up various entities within the framework of the invention. This modeling makes it possible to specify, depict, produce and document a software system by virtue of a notation which is recognized in the software industry.

Figure 3:
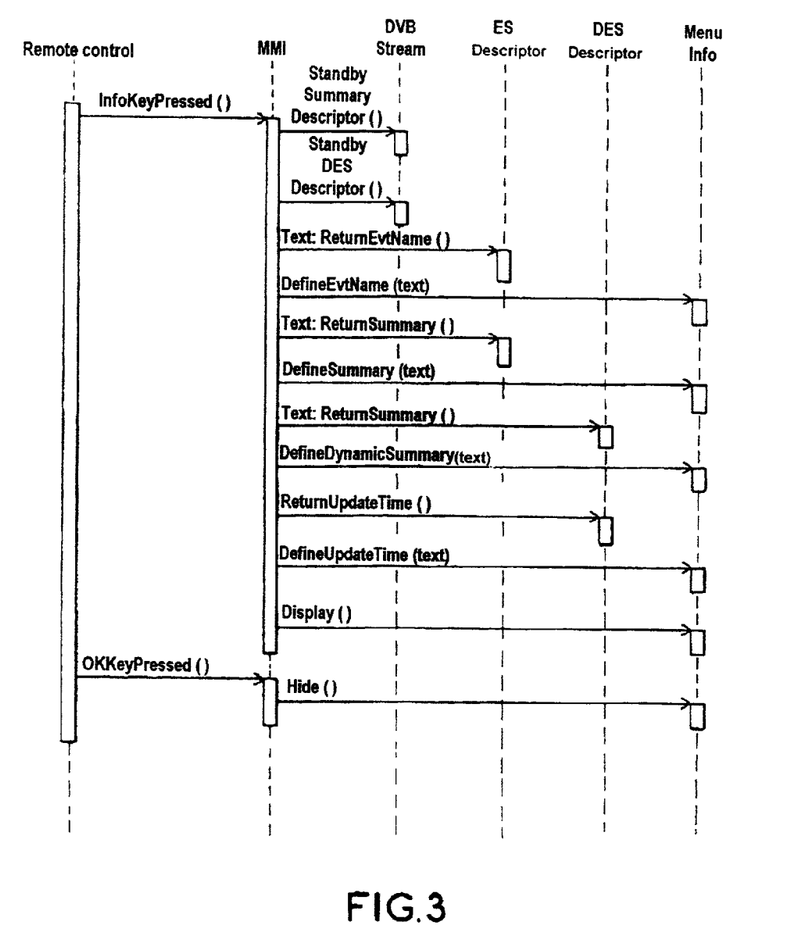
FIG. 3 represents a diagram of sequences of exchanges taking place between the various entities upon a user request for dynamic summary information, according to a first embodiment of the invention.

Hereafter, the microprocessor/demultiplexer, the management module and the customer application will be grouped together into a single conceptual entity referred to as the "Man/Machine Interface" or MMI, a designation which is well known to the person skilled in the art. FIG. 3 represents a diagram of sequences of exchanges taking place between the various entities upon a user request for dynamic summary information. FIGS. 2 and 3 elucidate the mechanism for acquiring the DES descriptor following a user request. The class diagram sets up the static aspects of the system {stream, MMI, descriptors, remote control, information menu}, that is to say defines the various entities of the system and their relations. On the other hand, the sequence diagram shows the dynamic aspects of the system, namely the chaining together of function calls. It will be noted that the diagram of FIG. 2 includes only the classes required for understanding the operation of the system.

The diagram of FIG. 2 includes the "Remote control receiver" class which talks to the "Man/Machine Interface" class. The latter comprises the InfoKeyPressed and OKKeyPressed methods. The Man/Machine Interface is also connected with the "InfoMenu" class whose attributes are the name of the event EvtName, the summary of the event Summary, the dynamic summary of the event DynamicSummary and the update time UpdateTime. The methods which can be called in this class are the methods of display Display( ), of masking Mask( ), of defining the name of the event DefineEvtName(text), of summary DefineSummary(text), of dynamic summary DefineDynamicSummary(text), and of update time DefineUpdateTime(text). It is recalled that, in a class diagram, the content of the brackets relating to a method corresponds to the type of the parameters expected as input. Furthermore, the parameters are named. Thus, an exact formulation of a written expression of the method of defining the time could be DefineTime (integer day, integer month, integer year). In a sequence diagram, and also in the code itself, the content of the brackets is called the effective parameter and is expressed for example as DefineTime(30, 9, 1999).

The "Man/Machine Interface" class is also connected with the three classes, "DESDescriptor", "DVB Stream" and "ESDescriptor".

The "Descriptor_DES" class has as attributes the version number Version_Number, the update time Update_Time and the summary Summary. These attributes are character strings. The callable methods are the methods calling up the summary ReturnSummary( ), the version number ReturnVersionNumber( ) and the time of update Return UpdateTime( ).

The "DVB Stream" class exhibits the standby methods for waiting for the static summary descriptor StandbySummaryDescriptor( ) and for waiting for the descriptor of the dynamic summary StandbyDESSummaryDescriptor( ).

The "ESDescriptor" class includes the event name EvtName and summary Summary attributes. The methods offered are the methods which return the event name ReturnEvtName( ) and the summary ReturnSummary( ).

The links connecting, on the one hand, the "Man/Machine Interface" class and, on the other hand, the three classes "DESDescriptor", "DVB Stream" and "ESDescriptor" are indicative in particular of the fact that the MMI can call up the methods of the respective classes.

On the other hand, the links connecting the "DESDescriptor" and "ESDescriptor" classes to the "DVB Stream" class are links representing composition relationships, that is to say the DVB stream is composed of the static and dynamic summary descriptors.

According to the embodiment of FIG. 3, the microprocessor analyses the information of the stream only when requested by the user.

The user selects the "INFO" key of the remote control. The remote control receiver calls up the InfoKeyPressed method of the MMI. The MMI calls up the "StandbySummaryDescriptor" and "StandbyDESSummaryDescriptor" methods of the DVB stream and thus puts itself on standby for the appearance in the DVB stream of the next static and dynamic summary descriptors. These are filtered according to the known methods of the patent application of the Applicant cited above at the level of the demultiplexer in tandem with their order of arrival in the stream.

The MMI then calls up the ReturnEvtName( ) method of the static summary descriptor which sends back to the MMI the name of the current event in the form of a string of "text" characters. This text is then defined for the information menu by the DefineEvtName(text) method in a first memory 251 of a block of memories 25 of the decoder of FIG. 1. The MMI then calls up the ReturnSummary( ) method which sends back to the MMI the static summary of the current event in the form of a character string. The consequence of this sequence is the recording of this static summary in a memory 252 of the block 25. This text is also defined for the information menu.

In the same way, the MMI calls up the ReturnSummary( ) method of the dynamic summary descriptor which sends back to the MMI the dynamic summary of the current event in the form of a character string. This dynamic summary is recorded in a third memory 253 of the block 25. This dynamic summary is defined for the information menu by the DefineDynamicSummary(text) method. The version number of the dynamic summary is held locally as described in the Applicant's patent application cited above. The MMI then calls up the ReturnUpdateTime( ) method which sends back to the MMI the time of the latest update of the dynamic summary. This time is also defined for the information menu and recorded in a fourth memory 254.

The MMI subsequently calls up the Display( ) method of the InfoMenu class and the information menu displays the name of the current event, its static summary, its dynamic summary and the time of the latest update at the current time.

When the user no longer wishes to view this latest information, he presses the OK key of the remote control, thereby calling up the OKKeyPressed( ) method and the MMI calls up the Hide( ) method of the InfoMenu class. The information menu then no longer displays the summary information.

Figure 4:
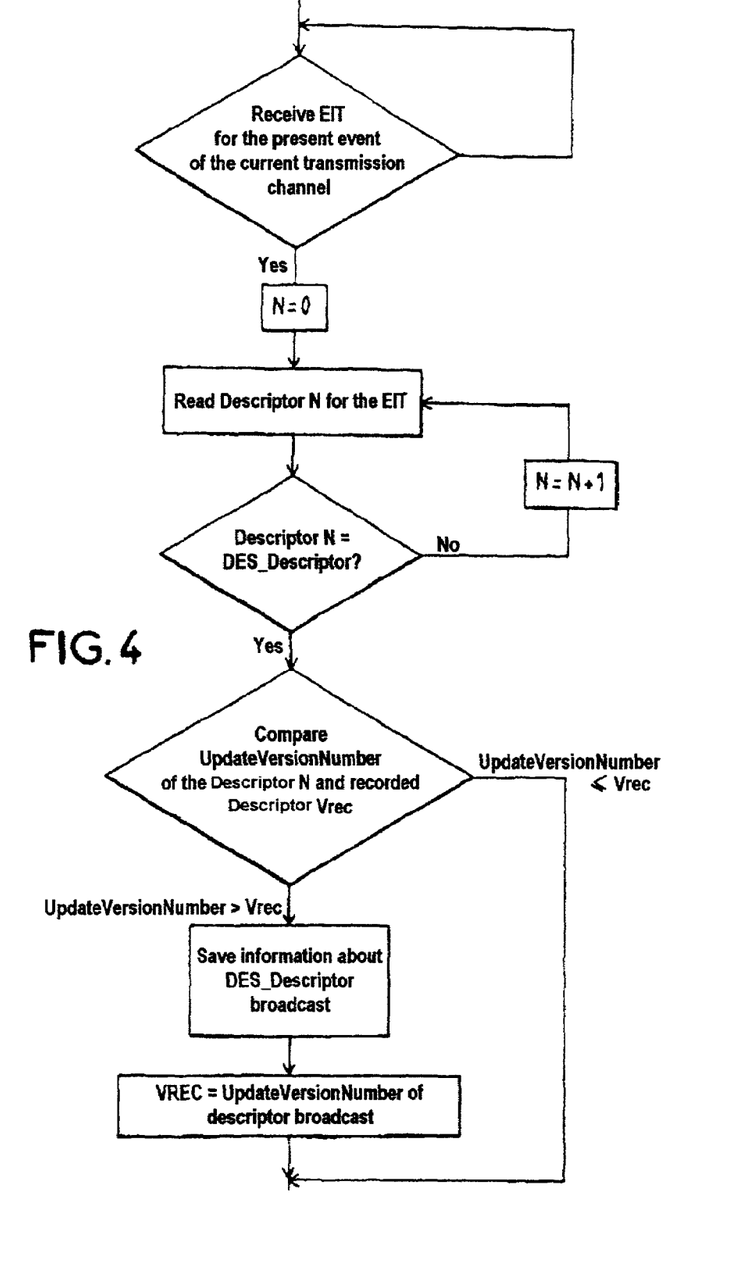
FIG. 4 represents a status diagram illustrating the extraction of a dynamic summary descriptor from the DVB stream, according to one embodiment of the invention.

FIG. 4 represents a status diagram illustrating the extraction of a dynamic summary descriptor from the DVB stream.

Upon a user request, the system is standing by to receive an EIT corresponding to the present event of the current transmission channel. If the current transmission channel contains an event information table EIT, the MMI begins to scan in succession the identifier of each descriptor of the table mentioned (table of descriptors corresponding to table 12 part 6 of the document EN 300 468 V1.3.1). So long as this identifier value is not that of a DES_descriptor, the MMI goes to the next descriptor.

When the MMI has found a DES_descriptor, it compares the update version number of the latter with the previous one. If the version number of the descriptor conveyed in the stream is less than or equal to that already stored, the descriptor will not be stored and the descriptor already stored will be retained for possible display. If, on the other hand, the version number of the descriptor extracted from the stream is greater than that already stored, then the dynamic summary text of the extracted descriptor replaces that recorded in the memory 253.

It will be noted that on startup and with each change of event, the VersionNumber field is reinitialized.

Thus, this first embodiment requires fewer resources in particular on the part of the microprocessor, but may induce a delay upon a request from the user corresponding to the time interval between two successive broadcasts of the DES_descriptor, i.e. around two seconds.

Figure 10:
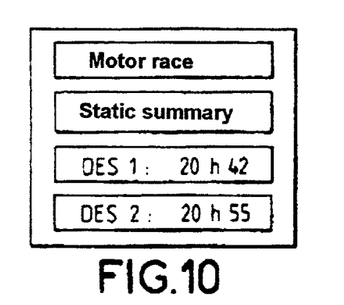
FIG. 10 represents another embodiment for displaying all the dynamic summaries which have been extracted from the demultiplexer.

According to a variant represented hereinbelow in FIG. 10, the text of the dynamic summary of the extracted descriptor does not replace the text recorded in the memory 254 but is recorded in a memory 255. In a recurrent manner, the content of each descriptor extracted from the DVB stream whose version number is greater than the number of the previous descriptor is recorded in a separate memory; in this way, the dynamic summary display request will display all of the dynamic summaries recorded in each of these memories, as is represented in FIG. 10. The dynamic summary corresponding to the concatenation of the partial dynamic summaries described is thus accumulated through successive slices relating to disjoint time intervals of the event.

Figure 5:
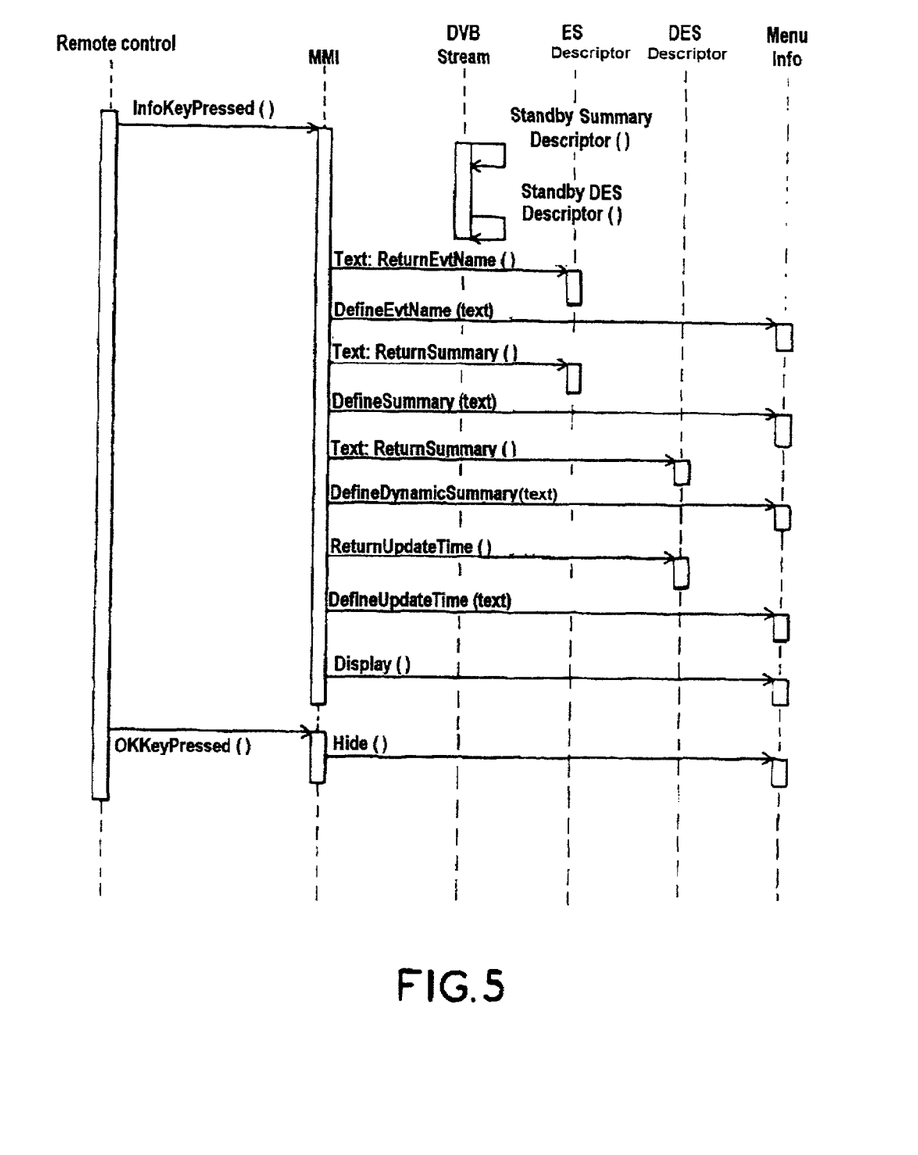
FIG. 5 represents a diagram of sequences of exchanges taking place between the various entities in the mode of permanent requests for extraction of dynamic summary descriptors, according to one embodiment of the invention.

FIG. 5 represents a sequence diagram for the exchanges taking place between the various entities in the mode of permanent requests for extraction of descriptors of dynamic summaries. The micro-processor analyses the information from the stream in continuous mode. This is manifested, in FIG. 5, by the fact that the "SummaryDescriptorStandby" and "DESDescriptorStandby" methods are called continuously. The information recovered can be stored in various ways: according to a first mode, the DES is stored temporarily in the buffer memory 6, each dynamic summary being replaced by the next one. According to another mode, all the dynamic summaries of the DES descriptors extracted in a continuous manner are recorded in the said separate memories so as to be able to be displayed when requested by the user.

In this version where the DES descriptors are constantly scanned in the stream, the information relating to the dynamic summary or summaries is constantly available in the cache memory and can be displayed immediately when requested by the user.

Figure 6:
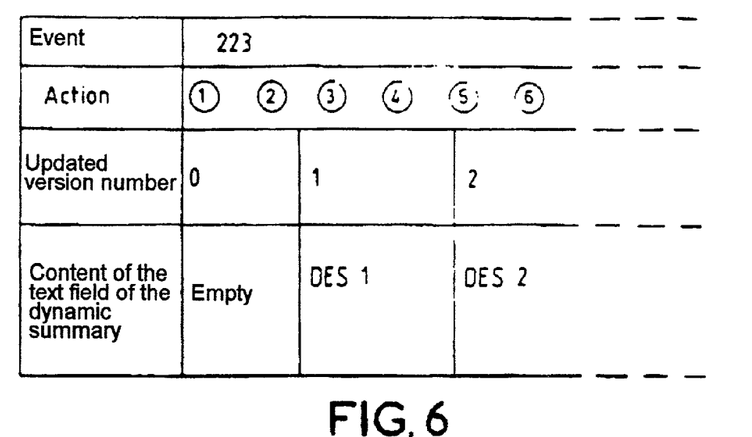
FIG. 6 represents an example of sequencing of information of an event within the framework of a motor race.

FIG. 6 represents an example of sequencing of information of an event within the framework of a motor race.

It is assumed in what follows that the delay between two successive transmissions of the dynamic summary descriptor is small compared with the various steps numbered from ① to ⑥ in FIG. 6, that is to say that it is of the order of a second.

The instant ① corresponds to the starting of the event. The content of the text field of the dynamic summary DES_descriptor is empty.

Figure 7:
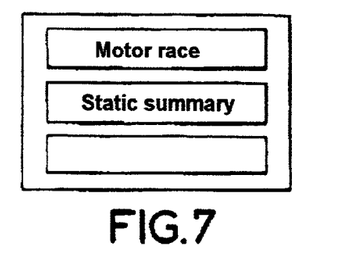
FIG. 7 represents a layout of an "information chart" of the event corresponding to FIG. 6 at the start of the race.

The instant ② corresponds to the moment when the user requests the display of information on the event in progress, the text field of the DES_descriptor not yet having been filled in by the program provider (because, for example, the race has not begun). The user then sees the content of the static summary return to the screen, as represented in FIG. 7.

The moment ③ identifies the start of the race. After the first lap, the program producer decides that the action which has just unfurled justifies the updating of the dynamic summary. He fills in the text field of the DES_descriptor of the summary of the actions which have unfurled in the interval and broadcasts the latter in the DVB stream.

Figure 8:
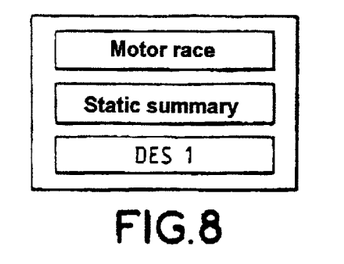

The user having been away between the instants ③ and ④, he requests the displaying of information on the event in progress. On his screen, he then views the information chart represented in FIG. 8. The latter comprises the name of the event "Motor race", the static summary SE and the dynamic summary DES1, respectively corresponding to the respective contents of the memories 251, 252 and 253 at the instant ④.

A development takes place at the instant ⑤ and the producer updates the content of the DES_descriptor broadcast.

Figure 9:
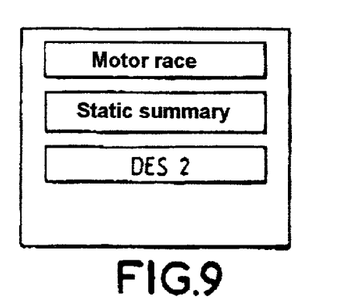

Thus, the user requesting the display of summary information at an instant ⑥ subsequent to ⑤, will view an updated dynamic summary DES2, as represented in FIG. 9.

According to another embodiment represented in FIG. 10, following a user request for summary information, the character generator 15 transmits the content of all the memories including the various dynamic summaries extracted in continuous mode, each dynamic summary being accompanied by the time of extraction of this summary from the stream.

According to an embodiment which is not described, an index is displayed on the television screen of the user viewing a televised event when a dynamic summary descriptor is extracted from the DVB stream or stored in a specific memory. The user is thus warned of the reception of this information and of its updating.

The subject of the invention is also a transmitter for transmitting the DES_descriptor and ESdescriptor descriptors described hereinabove. This transmitter, not illustrated, comprises, according to one embodiment, a multiplexer multiplexing the descriptors in the data stream. This transmitter comprises:

means for transmitting an event;

means for transmitting an upgradeable summary of the said event, the content of the said summary being dependent on the content of the event occurring at the latest up to the instant of transmission of the said summary.

The invention is of course not limited to the embodiments described.

Thus, following a user request to display a dynamic summary, the displaying has been described of a static summary, of one or more dynamic summaries, possibly jointly with their times of extraction from the stream. Any other information accompanying the dynamic summary of an event may be contemplated within the framework of the invention.

It has also been noted that the appearance of new dynamic summaries depends on the importance accorded to the current event. It is however possible to conceive of the transmitting of new dynamic summaries being carried out according to a fixed periodicity.

It should be noted that the invention is not limited solely to the transmission of data by satellite, over the airwaves or by cable, but can be implemented in any system where data or data packets appear periodically in the data stream. This is the case in particular for recorded or prerecorded data streams.

On the other hand, although the examples given relate most particularly to service data, it is clear that the invention is not limited to this type of data. So-called private data can, for example, be processed in a similar manner.

What is claimed is:

1. Process for transmitting service information in a television system comprising a transmitter and a receiver, wherein it includes the steps, at the level of the transmitter of:

transmitting an event;

transmitting a static summary of the event that contains a general summary of the event;

transmitting a plurality of partial dynamic summaries relating to disjoint times of the event, the content of a partial dynamic summary being dependent on the content of the event occurring since the transmission of the previous partial dynamic summary up to the instant of transmission of the current partial dynamic summary;

and at the level of the receiver of:

displaying the static summary before receiving the plurality of partial dynamic summaries and upon receipt of the plurality of partial dynamic summaries, concatenating the partial dynamic summaries successively received in a memory of the receiver, an upgradeable summary of the event being the result of the concatenating of all of the partial dynamic summaries, displaying the upgradeable summary in a window of a screen.

2. Process according to claim 1, wherein successive versions of the upgradeable summary are transmitted as a function of the varying of the content of the event according to one of the following modes:
- periodically, following the occurrence of a particular situation in the content of the event,
- following a command at the level of the transmitter of the event.

3. Process according to claim 1, wherein said partial dynamic summaries are transmitted in a digital stream which includes a specific identifier.

4. Process for processing service information using a television receiver, wherein the process includes the steps:
- of receiving an event;
- of receiving a static summary of the event that contains a general summary of the event;
- of receiving a plurality of partial dynamic summaries of the event, the content of the partial dynamic summary being dependent on the content of the event occurring since the transmission of the previous partial dynamic summary up to the instant of transmission of the current partial dynamic summary;
- of displaying the static summary before the receiving of the plurality of partial dynamic summaries and upon receipt of the plurality of partial dynamic summaries,
- of concatenating the partial dynamic summaries successively received, an upgradeable summary of the event being the result of the concatenating of the partial dynamic summaries,
- of storing the upgradeable summary in a memory of the receiver
- of displaying the upgradeable summary in a window of a screen.

5. Process according to claim 4, wherein the receiving, concatenating and storing steps are activated by a request from an application executed in the receiver, the application being preferentially a user interface.

6. Process according to claim 4, wherein it includes a step of depicting on depicting means the stored upgradeable summary, following a request from an application.

7. Process according to claim 6, wherein the step of depicting the upgradeable summary is performed upon each receipt of a new version, so that the depicting means permanently depict the latest upgradeable summary stored.

8. Receiver for receiving service information in a television system, comprising:
- receiving means for receiving events, a static summary of the event that contains a general summary of the event and a successive versions of upgradeable partial dynamic summaries of the event;
- means for concatenating the dynamic summaries successively received, the upgradeable summary of the event being the result of the concatenating of the partial dynamic summary;
- memory for storing the upgradeable summary in the receiver;
- display circuits for displaying the static summary of the event until a version of upgradeable partial dynamic summary is received and then displaying the upgradeable summary.

9. Receiver according to claim 8, wherein it includes a means of activation enabling the user to activate the means for displaying the upgradeable summaries.

10. Receiver according to claim 9, wherein it includes a detector to detect the reception of a new version of a dynamic summary, the detector activating the display means for displaying the upgradeable summary upon each new reception.

* * * * *